United States Patent
Bhate et al.

(10) Patent No.: US 7,113,699 B1
(45) Date of Patent: Sep. 26, 2006

(54) FAULT FORWARDING IN AN OPTICAL NETWORK

(75) Inventors: Anuradha Bhate, Sunnyvale, CA (US); Denis Houle, Ste-Anne-de-Bellevue (CA)

(73) Assignee: CIENA Corporation, Linthicum, MD (US)

(*) Notice: Subject to any disclaimer, the term of this patent is extended or adjusted under 35 U.S.C. 154(b) by 698 days.

(21) Appl. No.: 10/219,833

(22) Filed: Aug. 15, 2002

Related U.S. Application Data (60) Provisional application No. 60/312,700, filed on Aug. 15, 2001.

(51) Int. Cl.
*H04B 10/08* (2006.01)

(52) U.S. Cl. .................. 398/15; 398/3; 398/5; 398/23; 398/24; 398/177; 398/10; 398/17; 398/33; 398/38; 398/34; 398/59; 398/79; 398/83; 370/222; 370/224; 370/242; 370/226; 370/227; 370/228; 370/225

(58) Field of Classification Search .................. 714/4; 370/224, 222, 225, 242, 226, 227, 228; 709/226; 398/178, 3, 23, 24, 177, 5, 10, 15, 17, 33, 398/38, 34, 59, 79, 83
See application file for complete search history.

(56) References Cited

U.S. PATENT DOCUMENTS

| | | | |
|---|---|---|---|
| 6,038,678 A * | 3/2000 | Fukushima et al. ............ 714/4 |
| 6,359,713 B1 * | 3/2002 | DeCusatis et al. .......... 398/178 |
| 6,594,232 B1 * | 7/2003 | Dupont ....................... 370/224 |
| 2002/0165962 A1 * | 11/2002 | Alvarez et al. ............. 709/226 |

* cited by examiner

*Primary Examiner*—Hanh Phan
(74) *Attorney, Agent, or Firm*—Dougherty Clements; Christopher L. Bernard; Tyler S. Brown

(57) ABSTRACT

A system and method for forwarding fault information in an optical network is disclosed. Responsive to a fault being detected at a node, the fault information is forwarded to the destination node in the form of a loss-of-signal condition by turning off laser transmitters used to propagate the signal towards its destination. Thus, a node or other network element not capable of generating an alarm signal consistent with an established alarm signaling protocol, such as a SONET alarm indication signal (AIS) or an SDH multiplexer section alarm indication signal MS-AIS, may still forward the fault condition to a downstream element.

14 Claims, 8 Drawing Sheets

FAULT FORWARDING IN AN OPTICAL NETWORK

RELATED APPLICATIONS

This application claims priority under 35 U.S.C. § 119(e) to United States Patent Application No. 60/312,700, entitled "System And Method For Fault Correlation And Forwarding," filed Aug. 15, 2001, the contents of which are hereby incorporated by reference in their entirety in the present patent application.

BACKGROUND OF THE INVENTION

1. Field of the Invention

The present invention relates generally to fault detection and restoration in a unidirectional path switched ring network.

2. Description of Background Art

Figure 1:
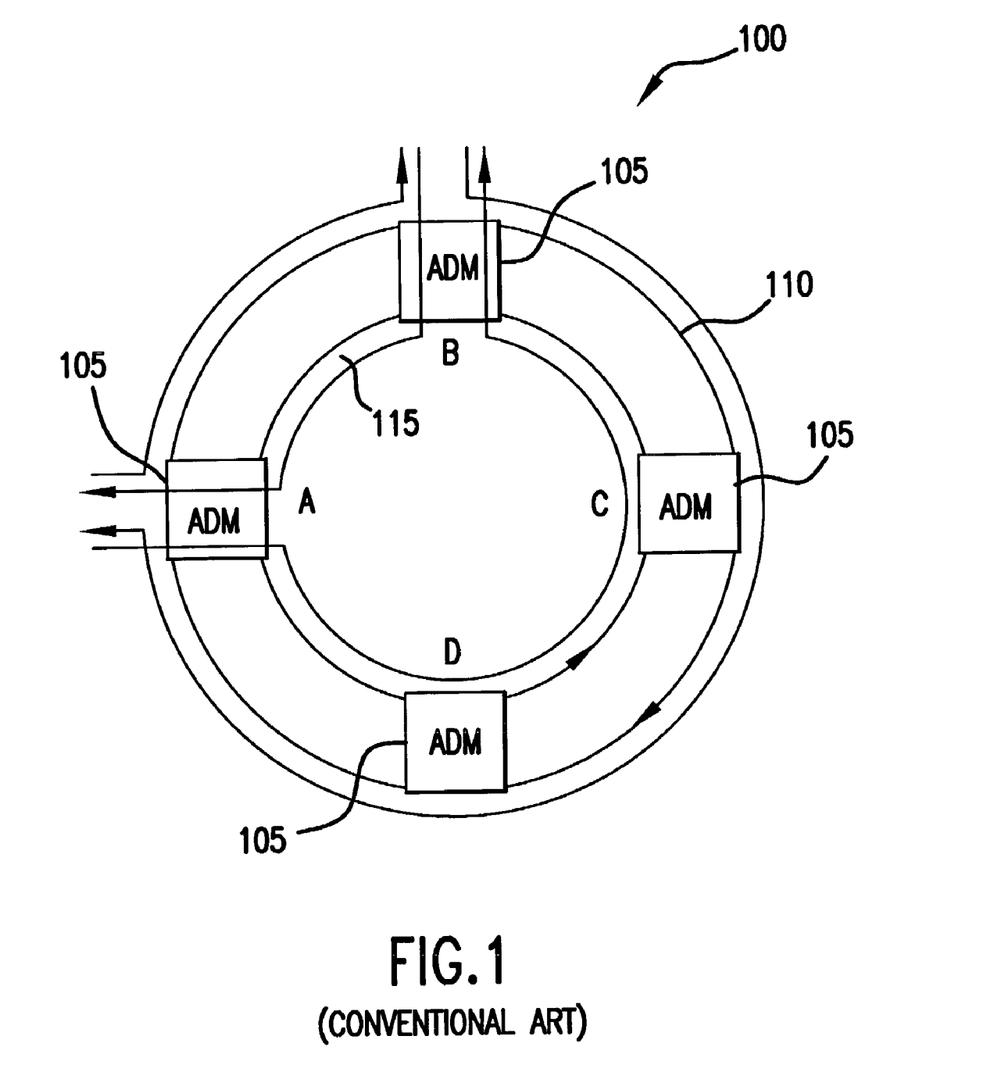
FIG. 1 is a functional block diagram of a conventional UPSR optical network.

Unidirectional path switched ring (UPSR) optical networks are of interest for telecommunications. Referring to FIG. 1, in a conventional UPSR network 100, a plurality of optical add drop multiplexer (ADM) nodes are coupled into a ring topology by a plurality of working fibers 110 and protection fibers 115. In a UPSR network traffic added at a source node is simultaneously sent on both the working and protection fibers to a destination node (also sometimes known as the "receiving node"). The two versions of the traffic are sent along opposite ring directions, e.g., in FIG. 1 traffic between nodes A and node B may be sent clockwise on the working fibers or counterclockwise on the protection fibers. The destination node selects the better version of the signal, which is coupled to the tributary network. Commonly, the default rule is that the working path signal is coupled to the tributary network unless a loss of signal or signal degradation is detected from the working path signal received by the destination node.

Some standard protocols permit alarm signals to be used to propagate fault information. For example, the synchronous digital hierarchy (SDH) and synchronous optical network (SONET) standards include alarm signal protocols. SONET, for example, includes an alarm indication signal (AIS), such as an alarm indication signal line (AIS-L), generated to replace a normal traffic signal when the traffic contains a defect condition, such as a loss of signal (LOS), loss of frame (LOF), or other form of degradation. The AIS notifies downstream devices of an upstream defect condition. This is particularly useful if signal degradation occurs at a tributary interface where the signal enters a source node. Similarly, SDH includes alarm signal protocols, such as a multiplexer section alarm indication signal MS-AIS.

However, some types of services do not have standard alarm signal protocols comparable to the AIS or MS-AIS. These include, for example, Gigabit Ethernet, Fiber Channel, and Clear Channel, for which there are no corresponding alarm signal protocol such as an AIS for forwarding fault information. Consequently, network performance may be deleteriously affected.

What is desired is a new system and method for forwarding fault information in an optical network.

The figures depict a preferred embodiment of the present invention for purposes of illustration only. One of skill in the art will readily recognize from the following discussion that alternative embodiments of the structures and methods disclosed herein may be employed without departing from the principles of the claimed invention.

DETAILED DESCRIPTION OF THE PREFERRED EMBODIMENTS

The present invention generally comprises a method and apparatus for forwarding fault information in an optical network in which at least some of the nodes provide a service (e.g., Gigabit Ethernet, Fiber Channel, or Clear Channel) for which there is no standard alarm signal for propagating fault information that is recognized throughout the entire optical network. However, in some embodiments the network nodes may also provide services, such as SONET and SDH, for which there are well-developed alarm signal protocols.

In the present invention, fault information may be propagated towards a signal destination by turning off a laser transmitter used to propagate the signal towards its destination. For example, in response to a node detecting a fault condition at a tributary interface or a line interface, the node turns off a corresponding laser transmitter used to propagate the signal towards its destination. As a consequence, fault information is rapidly propagated onwards towards the destination in the form of a loss of signal (LOS) condition. This method of forwarding fault information may be beneficially applied to optical networks having services incapable of generating alarm signals appropriate for the fault or which are not recognizable throughout the entire optical network.

Figure 2A:
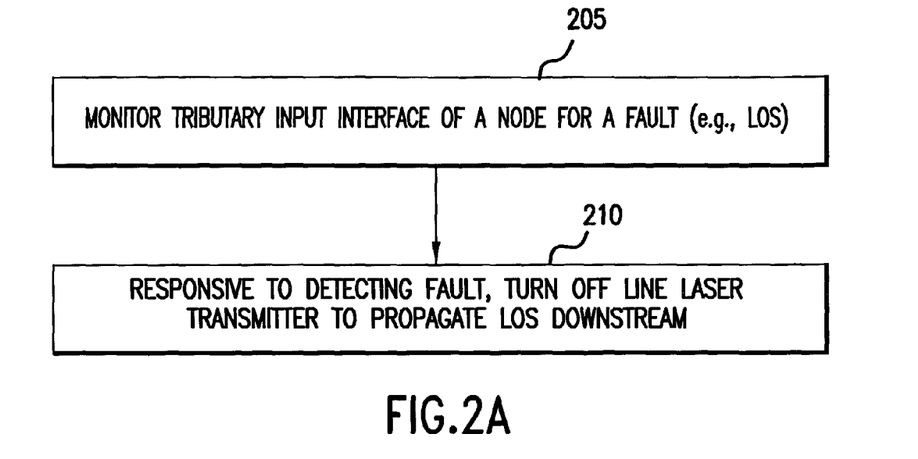
FIGS. 2A–2D are flow charts illustrating one embodiment of the method of the present invention.
Figure 2B:
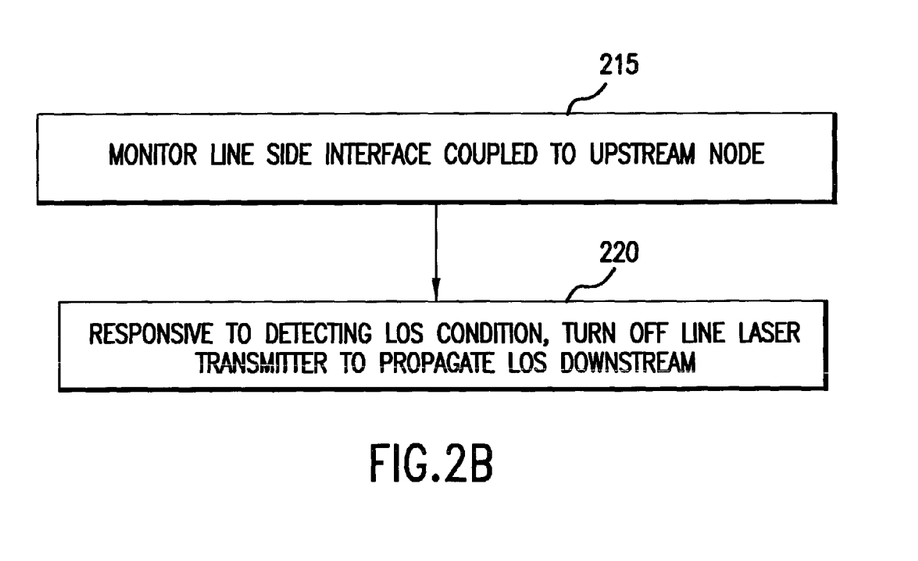

FIGS. 2A, 2B, 2C, and 2D are flowcharts illustrating one embodiment of the method of the present invention implemented in a UPSR network. Referring to the flow chart of FIG. 2A, in one embodiment, in response to detecting a fault at a tributary input interface of a node 205, a corresponding line side laser (e.g., a laser coupled via an add-drop multiplexer to other nodes of the network) used to transmit the traffic downstream on a wavelength channel is turned off 210. This enforces a loss of signal condition at the next downstream node for the wavelength channel. As indicated in FIG. 2B, responsive to detecting a fault (e.g., a loss of signal) at the line side of an intervening passthrough or regeneration node 215, a corresponding laser transmitter used to propagate the signal further downstream is turned off 220. As a result, if a source node turns off its laser transmitter in response to detecting a fault, a LOS condition for the wavelength channel will propagate towards the destination node since each subsequent intervening node will detect a LOS and turn off the associated line-side laser transmitter used to propagate the signal downstream.

Figure 2C:
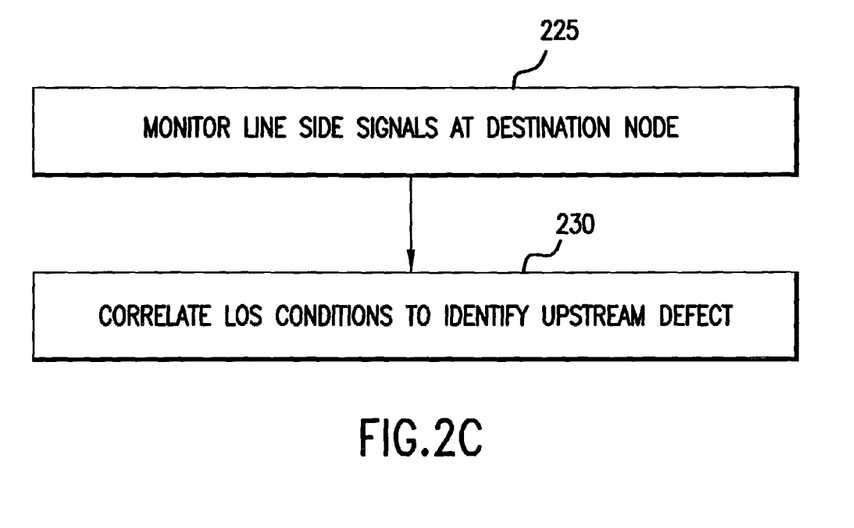

Referring to FIG. 2C, at the destination node, line side wavelength channel signals are monitored 225 for the working and protect path. By correlating signals 230, upstream defects may be identified. In particular, a loss of signal condition for both working and protect paths of a wavelength channel may be indicative of a loss of signal at the tributary interface of the source node prior to the traffic being duplicated and sent along opposite directions of the ring via the working and protect paths.

Alternatively, a loss of signal along only the working path or the protect path for a wavelength channel may be indicative of a line fault (e.g., a fiber break or node defect) between the source node and the destination node for only one of the paths. For this case, there is only one version of the signal for the destination to select (since the other version is in a LOS state).

Figure 2D:
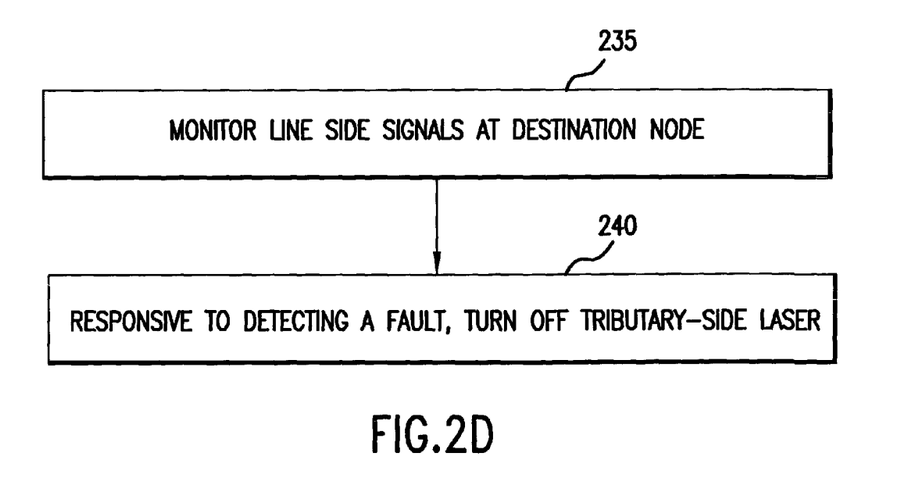

As indicated in FIG. 2D, in one embodiment, line side signals are monitored 235 at a destination node. Responsive to detecting a fault, a corresponding tributary-side laser used to propagate the signal to a tributary network is turned off 240. The tributary network fed by the trib-side laser is often customer premises equipment (CPE). Thus, turning off the trib laser responsive to a line-side fault ensures that invalid or otherwise garbage signals do not enter the CPE. Such an embodiment finds application in point-to-point or linear networks. In a UPSR configuration, the invention may determine when both working and protected transponders have a defect present on their line side before shutting down 240 the trib-side laser. When only one of the working and protect transponders have a defect on its line side then such a defect is implicitly taken care of by the UPSR switch that ultimately controls the trib-side transmitter.

The alarm condition that must be satisfied to determine to turn off a laser transmitter may comprise a variety of trigger conditions, such as a loss of signal (LOS), loss of modulation, or loss of synchronization. In one embodiment, the alarm condition is a loss of signal condition that may be declared at a node in response to the detected power level at a node decreasing below a pre-selected first threshold power level. The power level may be measured by an optical detector, such as an optical detector that is part of an optical receiver. The loss of signal condition is preferably terminated responsive to the detected power level exceeding a second threshold power level, which may be the same as the first threshold power level or higher, preferably for a pre-selected time interval to ensure a stable network condition.

For example, in one embodiment a LOS on the tributary side is declared if the power level decreases below −20 dBm and is terminated if the power level subsequently increases above −18 dBm, e.g., a 2 dB hysteresis. Correspondingly, in this example, a line side loss of signal is declared if the received power decreases below −30 dBm and is subsequently terminated if the power level returns to above −28 dBm.

Additionally, it will be understood that other types of faults or alarm conditions may be detected as used as a trigger to decide whether to turn off a line-side transmitter. For example, in an alternative embodiment, a loss of signal condition on a laser transmitter is declared if the signal is substantially degraded, such as by detection of an unacceptably low peak-to-valley modulation of the signal on the tributary interface or the line side; if the bit error rate exceeds a threshold level, or if other criterion are not met, such as loss of synchronization.

While other criterion such as loss of frame (LOF) or loss of pointer (LOP) could be used by the invention to trigger a laser shutdown, the ability to detect LOF or LOP implies an ability to perform SONET-compliant processing and is, therefore, not a preferred criterion at least not when the associated equipment is also capable of issuing an alarm indication signal (AIS). The reason for this preference is that a node or network element capable of performing SONET-compliant processing and capable of issuing an AIS would also prefer issuing the AIS rather than using the inventive fault forwarding techniques.

For example, there is increasing interest in optical networks that may be flexibly configured to provide a variety of services, including services having well-developed alarm protocols (e.g., SONET and SDH) and other services that do not have well-developed alarm signal protocols (e.g., Gigabit Ethernet, Fiber Channel, or Clear Channel).

Additionally in some optical networks, one or more services may not have well-developed alarm protocols recognizable by the entire network for a desired range of fault conditions. Consequently, in one embodiment of the present invention a node implements the fault forwarding technique illustrated in FIGS. 2A–2D if the service does not have having an alarm signal protocol appropriate for the fault that is recognized throughout the optical network. As an illustrative example, if a node if configured to provide SONET service, conventional SONET AIS alarms for loss of signal (LOS), loss of frame (LOF), BER, or signal fail may be transmitted downstream in response to a fault whereas for a service lacking an AIS protocol the node may turn off a laser transmitter to propagate fault information towards the destination node.

Figure 3:
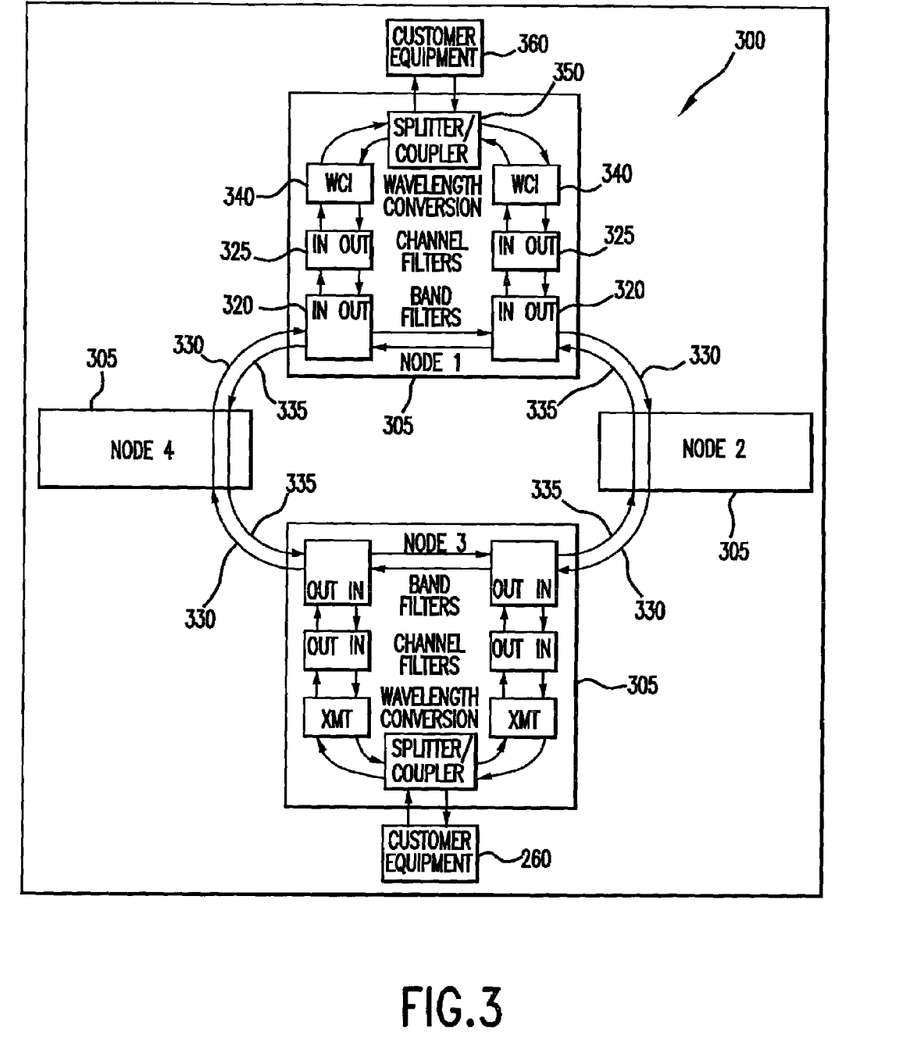
FIG. 3 is a block diagram illustrating features of an exemplary UPSR network.

One illustrative application of the present invention is in UPSR optical networks. FIG. 3 illustrates an exemplary UPSR network 300 for practicing the present invention. Each optical node 305 includes optical components for implementing an optical add drop multiplexer, such as band filters 320 and channel filters 325. Additional optical amplifiers (not shown) may also be included as preamplifiers or post-amplifiers. The optical network includes working fibers 330 and protection fibers 335 for communicating traffic simultaneously in two different directions along a working path and a protection path between a source node and a destination node. The traffic may be communicated between nodes using any suitable optical wavelength channel, although a wavelength of about 1550 nanometers is preferable, since this wavelength corresponds to low fiber loss and dispersion.

Referring to FIG. 3, communication between each node and a corresponding tributary network 360 (commonly known as "Customer Equipment") may be conducted at any suitable optical wavelength, but is commonly performed at wavelengths of about 850 nanometer or 1310 nanometers. Consequently, first and second wavelength conversion interfaces (WCIs) 340 including suitable transceivers are included to couple traffic between each node and its corresponding tributary network 360. A wavelength splitter/coupler 350 includes a wavelength splitter configured to permit added traffic to be split and separate versions of the input signal coupled to two WCIs for simultaneous transmission along working and protect fibers. Additionally, the wavelength splitter/coupler 350 includes a wavelength coupler to couple the best quality signal to tributary network 360 received by two WCIs at a destination node.

Figure 4:
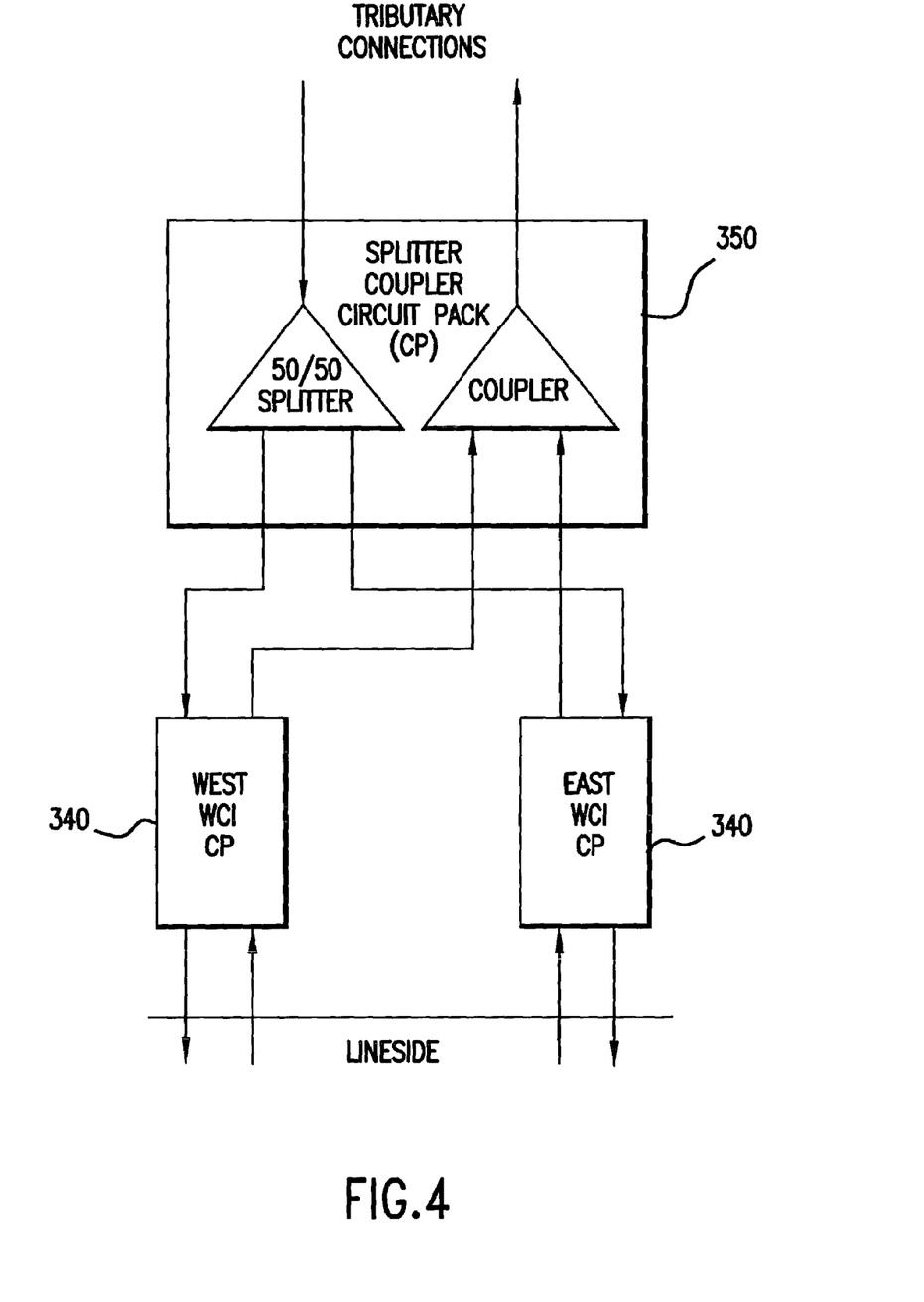
FIG. 4 is a block diagram illustrating an exemplary arrangement of wavelength converter interface modules for use in a UPSR node.

FIG. 4 is a block diagram showing in more detail the splitter/coupler 350 and WCIs 340. The two WCIs are commonly known as the "East" and "West" side WCIs since they are coupled, respectively, to corresponding line side interfaces of the node designated as "East" and "West" line interfaces to distinguish the two line interfaces for coupling fibers to each node. In one embodiment, the WCIs are implemented as separate circuit packs communicatively coupled (e.g., by an intranode backplane). In this embodiment a UPSR switch is performed by shutting off the short reach transmitter of one of the WCIs 340.

Figure 5:
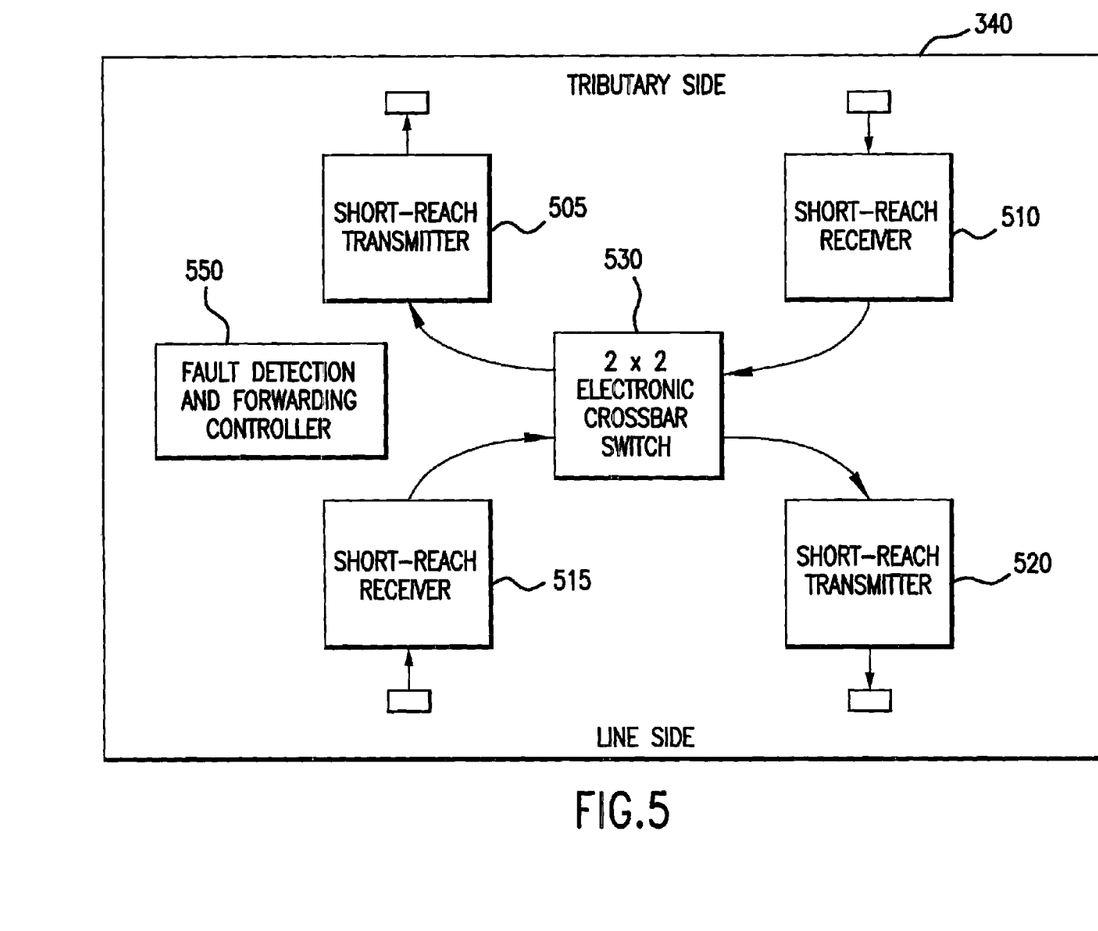
FIG. 5 is a block diagram of an exemplary wavelength converter interface module.

Referring to FIG. 5, in one embodiment, each WCI 340 includes a short reach transmitter 505, a short reach receiver 510, a long reach receiver 515, and a long reach transmitter 520. The short reach receiver 510 and short reach transmitter 505 are disposed on the tributary side; the long reach receiver 515 and long reach transmitter 520 are coupled to the line side. The short reach transmitter 505 includes a laser having an appropriate wavelength (e.g., 850 nm or 1310 nm) for communicating with the tributary network. The short reach receiver 510 includes an optical detector to receive signals from the tributary network. The long reach receiver 515 includes an optical detector to receive signals from the line side of the optical network. The long reach transmitter 520 includes a laser to generate optical signals at a line wavelength.

An electronic crossbar switch 530 permits the transmitters and receivers to be coupled in different ways. For example, the WCI may be configured to add traffic and drop traffic. For example, a signal received from the tributary side at short reach receiver 510 may be converted into a line-side signal at an appropriate line wavelength using long-reach transmitter 520. Correspondingly, a signal received at a line-side wavelength at long-reach receiver 515 may be converted into an appropriate tributary side wavelength via short-reach transmitter 505. Alternatively, the WCI may be configured to regenerate a signal (either 2R or 3R) by receiving a signal in a long-reach receiver 515 and regenerating the signal in long-reach transmitter 520. Regeneration may, for example, be performed as line-side regeneration (coupling signals from the long reach receiver to the long reach transmitter) as pass-through regeneration (e.g., by using an external fiber jumper to couple signals through both line and tributary sides of the WCI).

A controller 550 is configured to detect faults and turn off an appropriate laser transmitter to propagate the fault information downstream, e.g., towards the destination node. Controller 550 may, for example, be implemented as a microprocessor controller coupled to each WCI 540 that monitors the output signals at each receiver 510, 515, determines a loss of signal (LOS) condition, and shuts off a laser of transmitter 520 to propagate fault information to down stream nodes. Additionally, in destination node, controller 550 may turnoff transmitter 505 in response to detecting a LOS at receiver 515.

Figure 6:
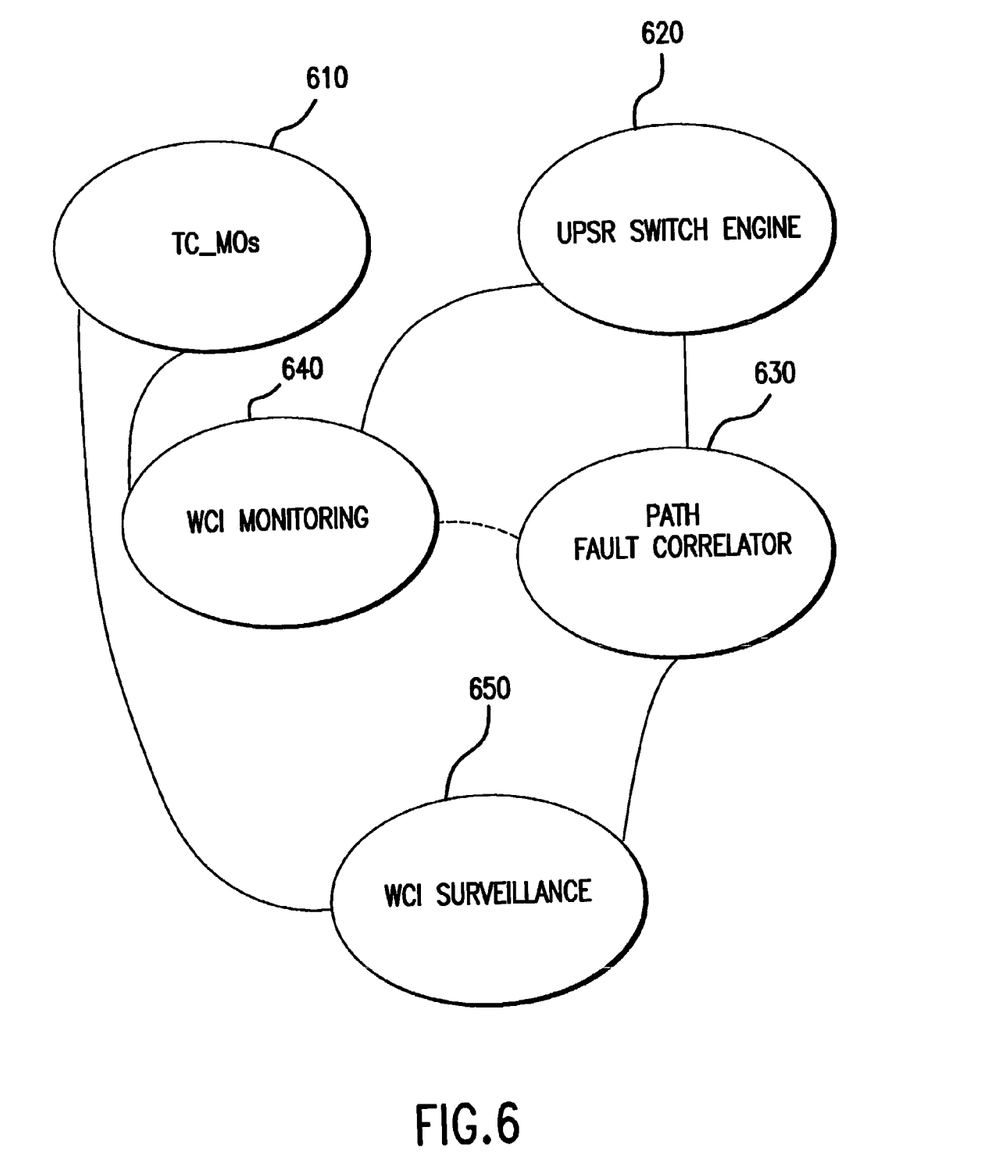
FIG. 6 is a diagram of one embodiment of a software implementation of a wavelength converter interface module controller.

FIG. 6 shows one embodiment of a controller 450 implemented as a microprocessor controller having software application modules residing on a local memory coupled to the microprocessor for implementing the desired control function. The software application modules may be implemented in the VxWorks® real time operating system (RTOS) as applications running on a corresponding thread. VxWorks® is available from Wind River Systems, of Alameda, Calif. VxWorks® is flexible, scalable, reliable, and available on embedded system CPU platforms. In this embodiment, a transport complex management objects (TC-MOs) module 610 is an application module configured to receive provisioning information from an element management system. The provisioning information may, for example, include information describing whether the node is configured to add, drop, or regenerate wavelength channels. Additionally, the provisioning information may also determine whether the node is configured for a SONET or non-SONET service. In a SONET mode of operation, controller 450 implements conventional SONET AIS protocols, such as loss of signal or loss of frame.

In a non-SONET mode of operation, controller 450 performs two principal functions. In a destination node it implements a UPSR switching event in response to detecting a loss of signal or a degraded signal, e.g., acts to select the highest quality signal. Additionally, in a source node or intermediate node, controller 450 forwards the fault information by turning off an appropriate laser transmitter in response to a LOS condition.

In one embodiment controller 450 includes a UPSR switch engine module 620, path fault correlator module 630, WCI monitoring module 640, and WCI surveillance module 650 are included. WCI surveillance module 650 is a software application that monitors the line side for a loss of signal and fault correlator 630 acts as a mediator between the UPSR switch engine 620 and WCI monitoring 640. Fault correlator module 630 determines if an alarm condition corresponding to switch triggers, has occurred. The fault correlator module 630 then communicates signal fail, signal degrade, or no request signal to the USPR switching engine module 620. If the signal is failed or degraded the UPSR switching engine 620 module may, for example, select the signal traveling along the other working path as the higher quality to be coupled to the tributary network, e.g., by shutting off an appropriate short-reach transmitter in the WCI so that only the signal received from the other path is coupled to the tributary network. In one embodiment, it also forwards a fault condition downstream, if necessary, by providing a signal instructing the WCI monitoring module 640 to turn off an appropriate long reach laser transmitter in a source node or in an intermediate pass-through node.

The UPSR switch engine module 620 preferably has a comparatively high priority thread. In VxWorks® RTOS there is priority value range of 0 to 255 with 0 being the highest priority thread. In one embodiment, the UPSR switch engine module 620 has a priority of 48, the path Fault Correlator module 630 has a priority value of 58, the WCI monitoring module 640 has a priority of 62, and WCI Surveillance module 650 has a priority of 64.

Figure 7:
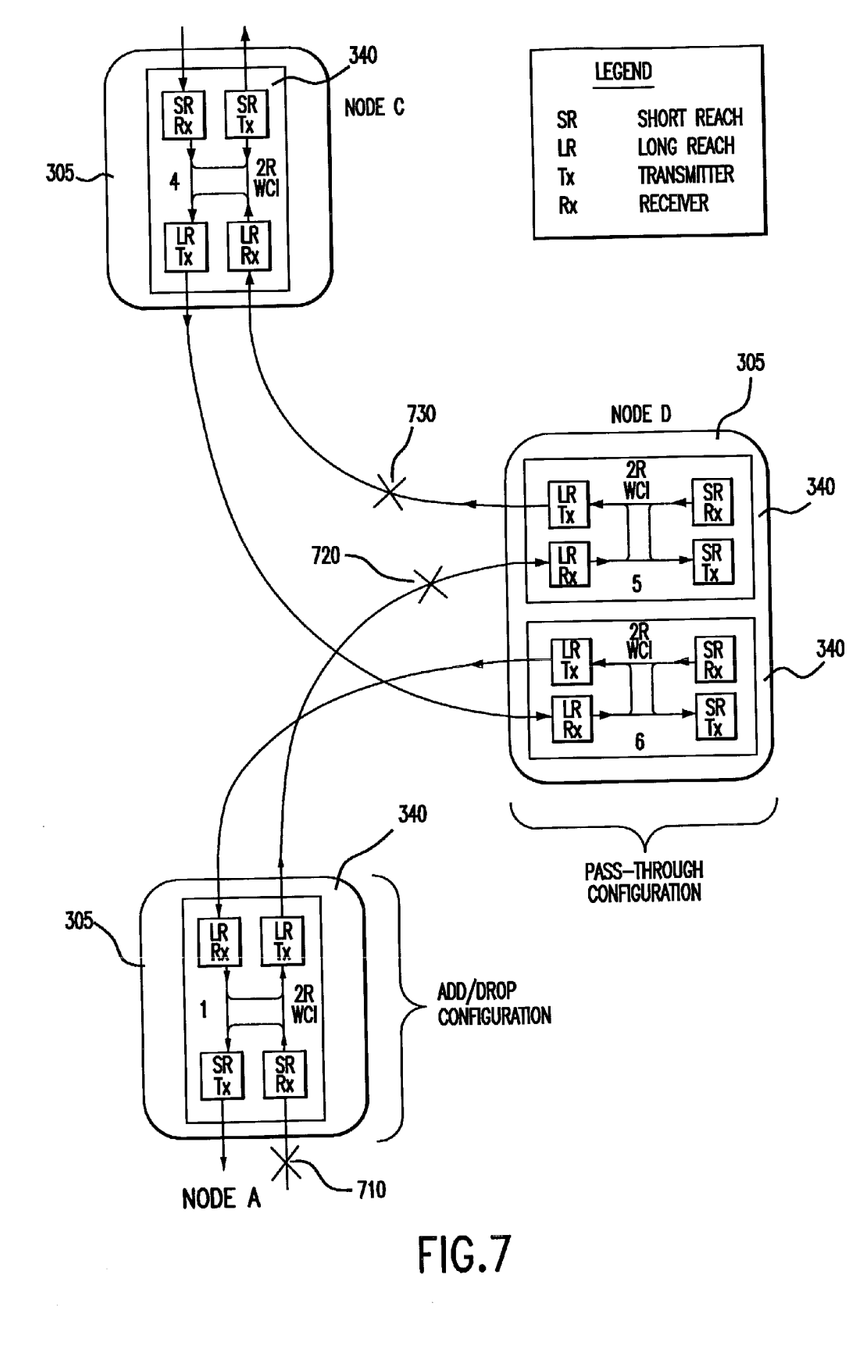
FIG. 7 is an illustrative diagram showing how a fault detected at a tributary interface of a source node is propagated as a loss of signal condition towards a destination node.

FIG. 7 is an illustrative block diagram showing portions of the WCI modules 340 of three nodes along an optical add-drop path between two nodes A and D and including a regeneration node, node B. Some aspects of each node are omitted for clarity. Node A and Node D are the add/drop nodes. Line lasers along the optical add/drop path must be shut down to propagate fault information for non-SONET applications. These include shutting down a line laser at a source node upon detecting a LOS on the tributary side and confirming that the WCI is in an add/drop mode. Additionally, the line laser needs to be shut down upon detecting a line LOS if the WCI is in a regeneration or passthrough mode.

Cross mark 710 in FIG. 7 illustrates a tributary side loss of signal. This would cause the line laser in node A to shut off. This will cause a corresponding line LOS at the long reach receiver, e.g., no signal at point 720. Since node D is a regen mode, the detection of a LOS on the lines side of WCI 5 will result in the corresponding long-reach laser transmitter being turned off, such there will be no optical output at point 730, resulting in a LOS on the line side receiver of Node D. The result is that the fault at node A is rapidly propagated to node D.

Although some of the illustrative descriptions are in the context of ring-based UPSR optical networks, it is to be understood that the invention is not limited thereto. For example, the inventive fault forwarding methods and apparatuses may also be applied to alternative topologies such as optical networks having interconnected rings, linear topologies, or mesh architectures.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method of propagating fault information in an optical network, comprising:

detecting a fault associated with a signal received by a node;

responsive to determining that the node is configured with a service capable of forwarding an alarm signal for the fault, forwarding the alarm signal;

responsive to determining that the node is configured with a service incapable of generating an alarm signal for the fault, turning off a laser transmitter associated with propagating the signal towards its destination; and wherein the node is one of a source node, a destination node, and an intervening node along an optical add-drop path between the source node and the destination node, wherein, in the source node case, the fault is detected at a tributary interface of the node, and the laser transmitter is a line-side laser transmitter for propagating the signal to another node, wherein, in the destination node case, the fault is detected at a line interface of the node, and the laser transmitter is a tributary-side laser transmitter for propagating the signal to a tributary network, and wherein, in the intervening node case, the fault is detected at a line interface of the node and the laser transmitter is a line-side laser transmitter for propagating the signal to a subsequent node along the optical add-drop path.

2. The method of claim 1, wherein the fault includes at least one fault selected from the group consisting of: a loss of signal, a loss of frame, loss of synchronization, loss of pointer, an unacceptable peak-to-valley modulation, an unacceptable bit error rate, and a degraded signal.

3. The method of claim 1, wherein the optical network is a UPSR network, and the method further comprises:

at the destination node, correlating loss of signal conditions detected along a working path and a protection path.

4. The method of claim 1, wherein the node is configured for a SONET service and a non-SONET service.

5. The method of claim 4, wherein the non-SONET service includes at least one service selected from the group consisting of: Gigabit Ethernet, Fiber Channel, and Clear Channel.

6. A method of propagating fault information in a UPSR network in which at least one node is provisioned to provide a service not having an alarm indication signal recognized throughout the network, comprising:

at a node disposed upstream of a destination node, detecting an alarm condition associated with a wavelength channel;

responsive to detecting the alarm condition, turning off a laser transmitter used for propagating the wavelength channel downstream, thereby propagating a loss of signal condition downstream towards the destination node; and wherein the node is a source node and the alarm condition is a loss of signal at a tributary interface to the node.

7. The method of claim 6, wherein the alarm condition comprises a power level of a tributary input signal being below a threshold power level.

8. The method of claim 6, further comprising: the destination node detecting an upstream fault responsive to detecting a loss of signal condition at a line interface of the destination node.

9. The method of claim 6, wherein the alarm condition includes at least one alarm condition selected from the group consisting of: a loss of signal, a loss of frame, loss of synchronization, loss of pointer, an unacceptable peak-to-valley modulation, an unacceptable bit error rate, and a degraded signal.

10. A method of propagating fault information in a UPSR network, comprising:

responsive to detecting the loss of signal condition at a tributary interface of a source node for an optical signal, turning off a laser transmitter used to propagate the optical signal downstream towards a destination node;

in a plurality of nodes having a laser transmitter for retransmitting a wavelength channel and responsive to detecting a loss of signal condition, turning off the corresponding laser transmitter used to propagate the optical signal downstream; and wherein a loss of signal condition at the tributary interface propagates downstream to the destination node, and wherein the nodes are configured to provide a SONET service having SONET alarm indication signals and a service not capable of generating an alarm signal recognizable by downstream nodes.

11. A method of propagating fault information in a UPSR network, comprising:

detecting a fault at a source node associated with a signal;

responsive to determining that the source node is capable of generating an alarm signal for the fault, forwarding fault information to at least one downstream node using the alarm signal;

responsive to determining that the source node is incapable of generating an alarm signal for the fault, turning off a laser transmitter used to propagate the signal downstream;

for each intervening node between the source node and a destination node, turning off each laser transmitter used to propagate the signal downstream responsive to detecting a loss of signal, thereby propagating a loss of signal condition towards the destination node;

at the destination node, identifying the loss of signal condition as being indicative of the fault; and wherein the node is configured to provide a SONET service having SONET alarm indication signals and a service not capable of generating an alarm signal recognizable by downstream nodes for the fault.

12. The method of claim 11, further comprising: the destination node correlating loss of signal conditions detected along a working path and a protection path line interface.

13. A UPSR optical node, comprising:

an optical add drop multiplexer;

at least one wavelength converter interface coupled to the optical add drop multiplexer having an optical receiver for receiving a signal and a laser transmitter for propagating the optical signal downstream;

a controller coupled to the wavelength converter interface configured to shut off the laser transmitter responsive to detecting a loss of signal condition at the optical receiver, thereby propagating a loss of signal condition downstream towards a destination node; and wherein the optical node is configured to provide a SONET service having SONET alarm indication signals and a service not capable of generating an alarm signal recognizable by downstream nodes.

14. A UPSR optical node, comprising:

means for detecting a loss of signal condition for a signal received at a tributary interface or a line interface;

means for turning off a laser transmitter used to propagate the signal downstream responsive to detecting the loss of signal condition;

means for correlating a loss of signal condition from an upstream node to identify an upstream fault; and wherein the optical node is configured to provide a SONET service having SONET alarm indication signals and a service not capable of generating an alarm signal recognizable by downstream nodes.

* * * * *